Figure 1:
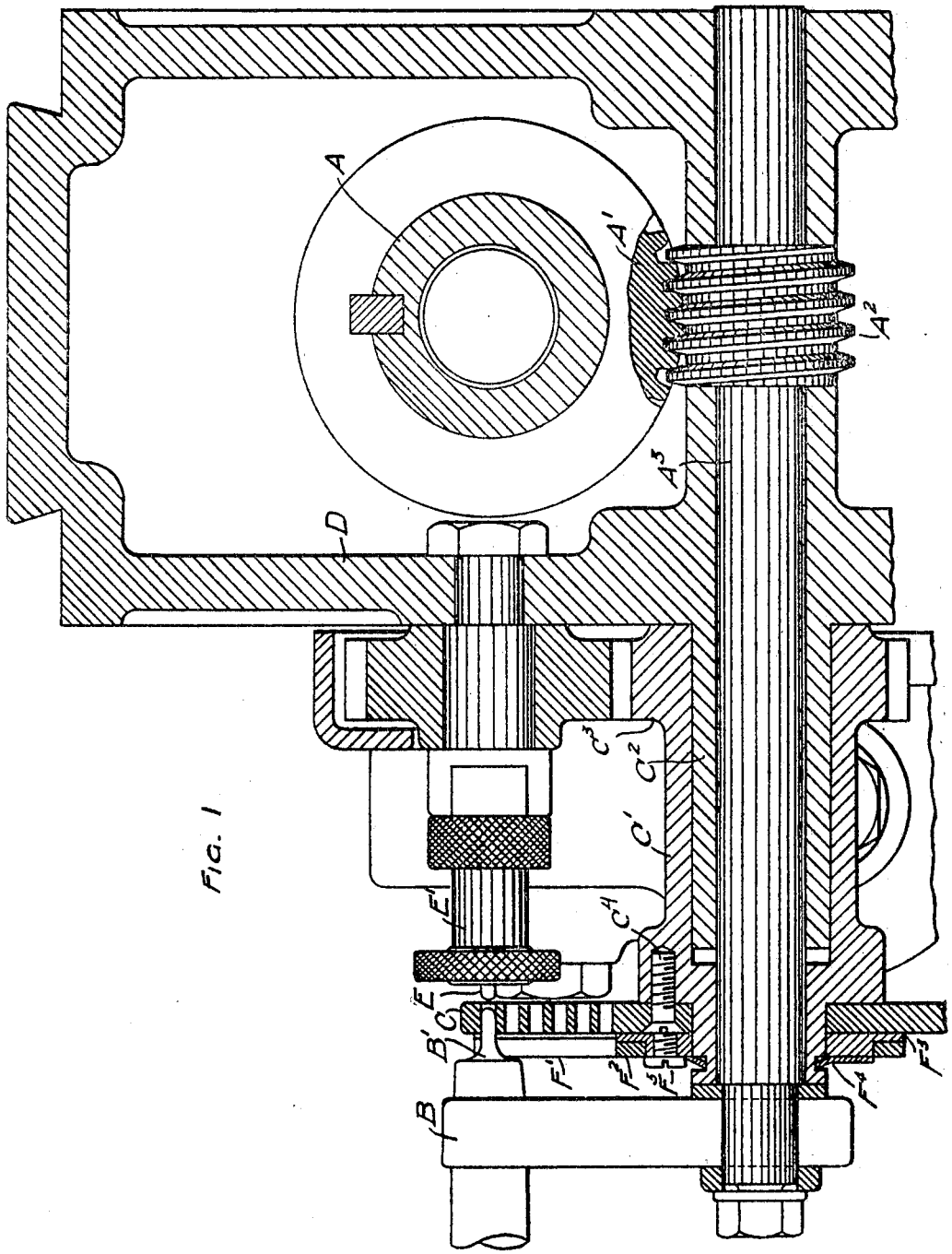

UNITED STATES PATENT OFFICE.

HUGH R. McGREGOR, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

INDEX-HEAD.

No. 798,970.        Specification of Letters Patent.        Patented Sept. 5, 1905.

Application filed February 5, 1904. Serial No. 192,170.

*To all whom it may concern:*

Be it known that I, HUGH R. McGREGOR, of the city and county of Providence and State of Rhode Island, have invented certain new and useful Improvements in Index-Heads; and I do hereby declare the following specification, taken in connection with the accompanying drawings, forming a part of the same, to be a full, clear, and exact description thereof.

The invention relates to index-heads such as are used, for instance, in milling-machines for supporting and spacing the work. These index-heads as commonly constructed are provided with an index-plate having circularly-arranged series of index-holes and with an index-pin carried in an arm connected, through suitable gearing, with the spindle of the head. During the cutting operation the index-pin is in engagement with one of the holes in the index-plate, and the work is therefore held in a definite relation to the index-plate. In spacing or indexing the work the index-pin is withdrawn from a hole in the index-plate and the arm carrying the pin is rotated through the distance required to give the desired spacing of the work and the pin then inserted either in the same hole or in a different hole in the index-plate. In order to quickly determine the proper hole into which the index-pin should be inserted in case the spacing does not require a given number of complete turns of the arm carrying the index-pin, the index-heads are provided with sector-arms, which may be set to embrace any desired number of holes on the index-plate. In setting these arms it has heretofore been necessary to count the number of holes which should be embraced between the arms for any given spacing, this number being taken from the index-table showing the proper number of turns to be given to the index-pin arm and the number of holes which should be embraced between the sector-arms to give the proper setting for any given spacing of the work. This manner of setting the sector-arms requires time and extreme care on the part of the operator, who almost invariably counts the holes to be embraced between the sector-arms a number of times to make sure that the setting is correct. This manner of setting the sector-arms also results in frequent errors in the setting by careless workmen or those inexperienced in the use of the index-heads.

In practicing the present invention the opportunity for mistakes in setting the sector-arms is reduced to a minimum, and provision is made for the accurate and rapid setting of the sector-arms by providing a series of graduations on the sector-ring, by the use of which the necessity for counting the holes is eliminated.

The invention will be more fully explained in connection with the following detailed description of a well-known form of index-head provided with the invention.

Figure 2:
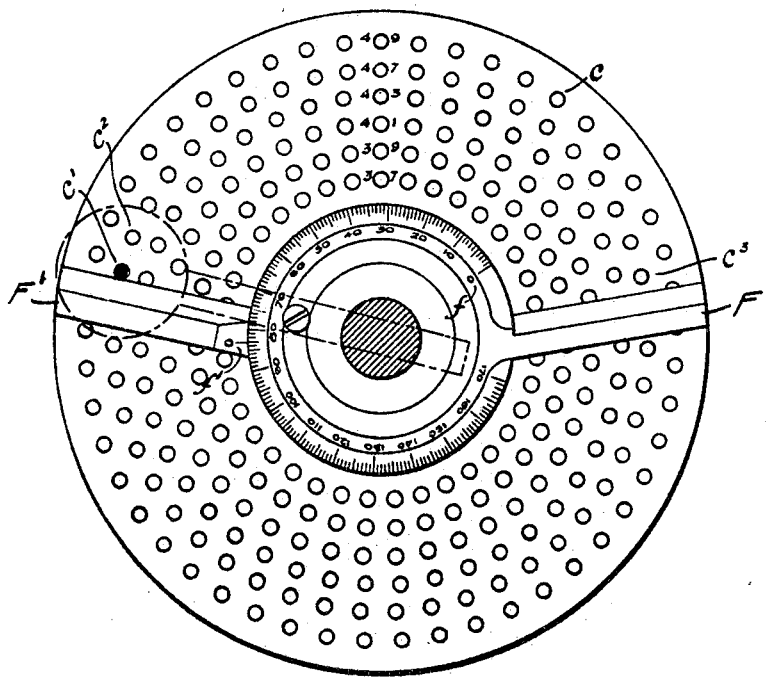

In the accompanying drawings, in which this index-head is illustrated, Figure 1 is a vertical sectional view of so much of an index-head as is necessary to show the application of the present invention thereto; and Fig. 2 is a front elevation of the index-plate and sector-arms, the index-pin arm being indicated in dotted lines.

In the construction shown in the drawings, A indicates the spindle of the index-head, which is provided with a worm-wheel A', engaged by a worm $A^2$ on the index-shaft $A^3$. The index-pin arm B is secured in the outer end of the index-shaft $A^3$ and carries the index-pin B', which is forced yieldingly forward by a spring (not shown) in the usual manner. The index-plate C is secured to a sleeve C', surrounding the index-shaft $A^3$ and mounted on a bearing $C^2$, projecting from the frame D of the index-head. The sleeve C' is provided with a gear $C^3$, which may be connected by a train of gearing with the feed-screw of the work-table on which the index-head is mounted in making spiral cuts. When using the index-head for making straight cuts, the index-plate C may be held in fixed position by a stop-pin E, carried on a sleeve E' and arranged to be engaged with one of the holes in the index-plate. This stop-pin may also be engaged with the index-plate to hold it in fixed position during the indexing in case the head is being used in making spiral cuts. The index-plate is provided with the usual circularly-arranged series of index-holes c, the holes in each series being equally spaced and the number of holes varying in the different series. The index-plate is secured to the sleeve C' by a screw $C^4$ to enable different index-plates to be employed. The index-pin arm B is radially adjustable of the shaft $A^3$, so that the index-pin may be brought into position to register with the holes in any one of the series in the index-plate. The sector-arms F F' project from the sector-rings F² F³, which are mounted on the end of the sleeve C' in front of the index-plate and are held frictionally in position by a friction-plate F⁴. The sector-ring F³ is provided with an annular groove in its outer face, in which the sector-ring F² is mounted, and these rings are clamped together after being relatively adjusted by means of a clamping-screw F⁵.

As thus far described the construction corresponds to the construction of index-heads which have been heretofore in use and is shown merely for the purpose of illustrating one form of index-head in which the invention may be embodied.

Heretofore in the use of index-heads such as above described, in which sector-arms, such as arms F F', have been employed for determining the proper hole into which to insert the index-pin at the completion of the indexing, it has been necessary to count the number of holes embraced between the arms in setting the sector-arms. Suppose, for instance, that the operator on looking at the index-table finds that the number of turns to be given to the index-arm B for the required spacing is twenty forty-sevenths of a turn or a certain number of complete turns and twenty forty-sevenths of a turn. In such case he so adjusts the arm B that the pin B' will register with the series of holes in the index-plate which contains forty-seven holes and inserts the pin B' in a hole, as $c'$, in such series. The arms F F' are then adjusted so that there will be twenty spaces between them when arm F is against the pin B'. This is done by bringing the arm F against the pin B', counting twenty holes, beginning with hole $c^2$, and then adjusting arm F' so that the twentieth hole $c^3$ is the last hole uncovered between the arms. The arms are then clamped in this relative position by tightening the screw F⁵. Now when the work is to be indexed the pin B' is withdrawn from the hole $c'$ and the arm B turned until the pin registers with the hole $c^3$ in case the spacing requires twenty forty-sevenths of a turn. If the spacing requires a number of complete turns and twenty forty-sevenths of a turn, the operator gives the arm the required number of complete turns and then inserts the pin B' in the hole $c^3$. When the work is to be again indexed, the sector-arms are swung around until the arm F again engages the pin B' and the above operation is repeated.

In practicing the present invention means are provided for indicating the proper adjustment of the sector-arms for any given spacing of the work without the necessity of counting the holes in the index-plate which are to be embraced between the sector-arms. This means consists of a series of graduations $f$ on the sector-ring F² and a coöperating mark $f'$ on the sector-ring F³. The graduation of the sector is purely arbitrary and may divide the circle into any convenient number of parts. These graduations should, however, be separated by angular distances less than the angular distance between adjacent holes in any series of holes in the various index-plates to be used if the graduations are to enable the sector-arms to be set for any and every spacing of the work. The location of the coöperating mark on the ungraduated sector-ring is also purely arbitrary. In the construction shown the graduations on the sector-ring are so spaced that they would divide the circle into two hundred equal parts. These graduations are numbered, and the index-table is provided with a column indicating the proper setting of the sector-arms for any given spacing of the work. To illustrate, suppose the worm-wheel A' and the worm A² are so proportioned that one turn of the arm B turns the spindle A through one-fortieth of a revolution—that is to say, suppose the worm-wheel and worm are in the ratio of forty to one—and suppose it is desired to divide the work into ninety-four divisions. In such case in order to set the sector-arms properly for a spacing which will provide for ninety-four equally-spaced cuts upon the work the operator finds upon looking at the index-table that the proper index-circle to be used is the one containing forty-seven holes and that the sector-arms should be set with the zero-mark $f'$ upon the graduation "83" of the graduated sector-ring. This is the setting corresponding to that shown in Fig. 2, in which there are twenty-one holes in the index-circle having forty-seven holes embraced between the sector-arms. The operator, however, reads the number of graduations corresponding to this setting directly from the index-table and sets the sector-arms without the necessity of counting the number of holes. The setting of the sector-arms can therefore be easily and quickly made and with less opportunity for error than when it is necessary to count the number of holes to be included between the two arms of the sector.

What I claim, and desire to secure by Letters Patent, is—

An index-head having in combination a spindle, an index-pin, an index-plate provided with several series of circularly-arranged holes for coöperating with said pin, one of said parts being connected with the spindle to turn the same, sector-rings carrying sector-arms, a series of graduations on one sector-ring separated by angular distances not greater than the angular distance between adjacent holes in the most closely arranged series in the index-plate, and a coöperating mark on the other sector-ring, substantially as described.

HUGH R. McGREGOR.

Witnesses:
W. H. THURSTON,
J. H. THURSTON.